United States Patent
Gallella et al.

(10) Patent No.: US 9,430,647 B2
(45) Date of Patent: Aug. 30, 2016

(54) PEER-AWARE SELF-REGULATION FOR VIRTUALIZED ENVIRONMENTS

(71) Applicant: MCAFEE, INC., Santa Clara, CA (US)

(72) Inventors: Ron Gallella, Beaverton, OR (US); Virginia Robbins, Hillsboro, OR (US); Ben Sherwood, Hillsboro, OR (US); Joseph Dodge, Beaverton, OR (US); Paul R. Spear, Anahola, HI (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/840,051

(22) Filed: Mar. 15, 2013

(65) Prior Publication Data

US 2014/0283077 A1 Sep. 18, 2014

(51) Int. Cl.
*G06F 21/56* (2013.01)
*G06F 21/53* (2013.01)

(52) U.S. Cl.
CPC .............. *G06F 21/566* (2013.01); *G06F 21/53* (2013.01)

(58) Field of Classification Search
CPC ............................... G06F 21/566; G06F 21/53
USPC ........................................... 726/24; 718/104
See application file for complete search history.

(56) References Cited

U.S. PATENT DOCUMENTS

| | | | |
|---|---|---|---|
| 7,085,934 B1 * | 8/2006 | Edwards .......................... | 726/24 |
| 8,181,247 B1 * | 5/2012 | Pavlyushchik et al. .......... | 726/22 |
| 8,234,640 B1 * | 7/2012 | Fitzgerald et al. ................ | 718/1 |
| 8,443,363 B1 * | 5/2013 | Brennan et al. ................... | 718/1 |
| 8,458,695 B2 * | 6/2013 | Fitzgerald et al. ................ | 718/1 |
| 8,516,478 B1 * | 8/2013 | Edwards et al. .................. | 718/1 |
| 8,612,971 B1 * | 12/2013 | Fitzgerald et al. ................ | 718/1 |
| 8,863,279 B2 * | 10/2014 | McDougal .............. G06F 21/56 713/188 |
| 2005/0149749 A1 * | 7/2005 | Van Brabant .................. | 713/200 |
| 2008/0134175 A1 * | 6/2008 | Fitzgerald et al. ................ | 718/1 |
| 2008/0250407 A1 | 10/2008 | Dadhia et al. | |
| 2008/0320594 A1 * | 12/2008 | Jiang ............................... | 726/24 |
| 2009/0089879 A1 * | 4/2009 | Wang ...................... G06F 21/53 726/24 |
| 2009/0265707 A1 * | 10/2009 | Goodman et al. ................ | 718/1 |
| 2010/0332593 A1 | 12/2010 | Barash et al. | |
| 2011/0219450 A1 * | 9/2011 | McDougal .......... H04L 63/1416 726/23 |
| 2012/0144489 A1 * | 6/2012 | Jarrett et al. ..................... | 726/24 |
| 2013/0247202 A1 * | 9/2013 | Yablokov ......................... | 726/24 |
| 2014/0283056 A1 * | 9/2014 | Bachwani ............... G06F 21/56 726/23 |

FOREIGN PATENT DOCUMENTS

WO 2011/002818 A1 1/2011

OTHER PUBLICATIONS

International Search Report and Written Opinion received for PCT Patent Application No. PCT/US2014/019943, mailed on Jul. 17, 2014, 10 pages.

\* cited by examiner

*Primary Examiner* — Joseph P Hirl
*Assistant Examiner* — J. Brant Murphy
(74) *Attorney, Agent, or Firm* — Baker Botss L.L.P.

(57) ABSTRACT

Technologies for self-regulation for virtualized environments may include, by a virtual machine on an electronic device, detecting an attempted anti-malware operation by a monitored module, determining anti-malware operation levels of one or more other virtual machines on the electronic device, and, based on the attempted anti-malware operation and upon the anti-malware operation levels, determining whether to allow the attempted operation.

24 Claims, 4 Drawing Sheets

PEER-AWARE SELF-REGULATION FOR VIRTUALIZED ENVIRONMENTS

TECHNICAL FIELD OF THE INVENTION

Embodiments of the present invention relate generally to computer security and distributed computing and, more particularly, to peer-aware self-regulation for virtualized environments.

BACKGROUND

Malware infections on computers and other electronic devices are very intrusive and hard to detect and repair. Anti-malware solutions may require matching a signature of malicious code or files against evaluated software to determine that the software is harmful to a computing system. Malware may disguise itself through the use of polymorphic programs or executables wherein malware changes itself to avoid detection by anti-malware solutions. In such case, anti-malware solutions may fail to detect new or morphed malware in a zero-day attack. Malware may include, but is not limited to, spyware, rootkits, password stealers, spam, sources of phishing attacks, sources of denial-of-service-attacks, viruses, loggers, Trojans, adware, or any other digital content that produces unwanted activity. Anti-malware protection must be updated periodically to provide ample defense against ever-evolving malware.

BRIEF DESCRIPTION OF THE DRAWINGS

For a more complete understanding of embodiments of the present invention and its features and advantages, reference is now made to the following description, taken in conjunction with the accompanying drawings, in which.

DETAILED DESCRIPTION

Figure 1:
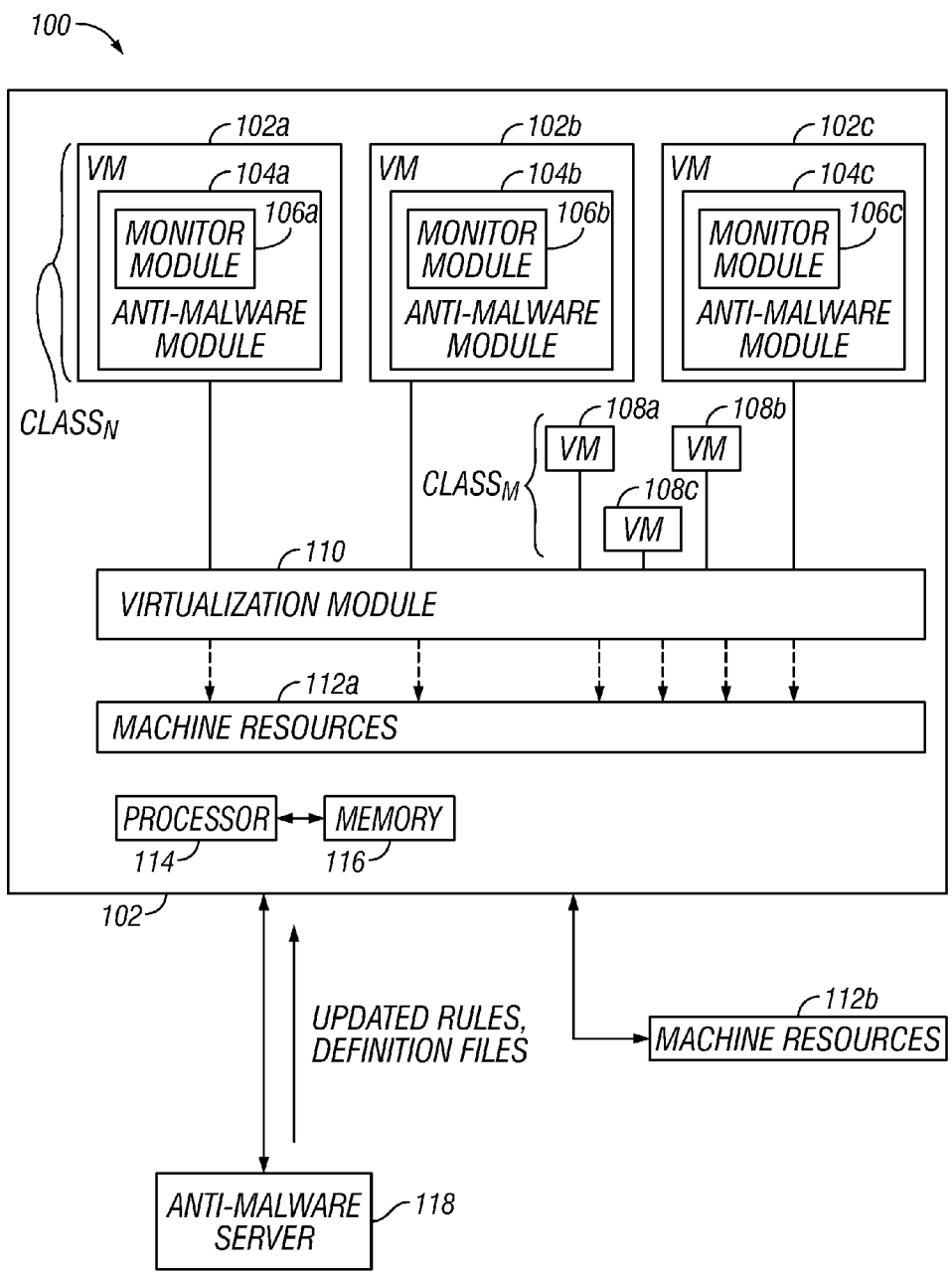
FIG. 1 is an illustration an illustration of an example embodiment of a system for peer-aware self-regulation for virtualized environments.

FIG. 1 is an illustration of an example embodiment of a system 100 for peer-aware self-regulation for virtualized environments. In one embodiment, such peer-aware self-regulation may include throttling usage of resources. Virtualized environments may allow the operation and execution of more than one guest operating system or virtual machine on a single electronic device. The actual physical resources of the electronic device may be virtualized to each such virtual machine, which may share the resources. However, because each such virtual machine may be removed from direct contact with the resources of the electronic device and may be executing within a virtualization environment, each such virtual machine may be unaware of the operation or even existence of similarly situated virtual machines.

System 100 may include at least one electronic device 101. Electronic device 101 may be implemented in any suitable manner, such as on a computer, server, mobile device, blade, cloud computing scheme, digital circuitry, analog circuitry, or any combination thereof. Electronic device 101 may include a plurality of instances of virtual machines (VM) or guest operating systems, such as VMs 102 and 108. Each such VM may have virtualized access to the machine resources 112 of electronic device 101.

Machine resources 112 may include any resource of or associated with electronic device 101. For example, machine resources 112 may include memory, processors, portions of processors, storage, busses, network devices, peripheral devices, input-output devices, registers, caches, pages, tables, or operating system elements. Such resources may be located internal to electronic device 101, as shown in machine resources 112a, or external to electronic device 101, as shown in machine resources 112b. Each VM 102, 108 may attempt to access machine resources 112, but may instead access a virtualized version of machine resources 112.

Electronic device 101 may include any suitable mechanism for virtualizing access of machine resources 112 to VMs 102, 108. For example, electronic device 101 may include a virtualization module 110. Virtualization module 110 may be implemented by, for example, a hypervisor. Virtualization module 110 may include, for example, an application, logic, instructions, program, script, library, shared library, function, add-in, or other suitable entity. Virtualization module 110 may be configured to intercept attempted access of machine resources 112 by VMs 102, 108, and to provide access to virtualized versions of such resources. Furthermore, virtualization module 110 may be configured to present virtualized versions of machine resources 112 to VMs 102, 108, for use. In addition, the execution of VMs 102, 108 may occur completely within the confines of virtualization module 110, such that VMs 102, 108 are isolated from direct contact with the outside and with each other. All interaction from a given VM 102, 108 may be controlled or monitored by virtualization module 110.

Electronic device 101 may include a processor 114 coupled to a memory 116. Processor 114 may comprise, for example, a microprocessor, microcontroller, digital signal processor (DSP), application specific integrated circuit (ASIC), or any other digital or analog circuitry configured to interpret and/or execute program instructions and/or process data. In some embodiments, processor 114 may interpret and/or execute program instructions and/or process data stored in memory 116. Memory 116 may be configured in part or whole as application memory, system memory, or both. Memory 116 may include any system, device, or apparatus configured to hold and/or house one or more memory modules. Each memory module may include any system, device or apparatus configured to retain program instructions and/or data for a period of time (e.g., computer-readable storage media). Instructions, logic, or data for configuring the operation of system 100, such as configurations of components such as each of VMs 102, 108, their contents, and virtualization module 110 may reside in memory 116 for execution by processor 114.

Processor 114 may execute one or more code instruction(s) to be executed by the one or more cores of the processor. The processor cores may follow a program sequence of instructions indicated by the code instructions. Each code instruction may be processed by one or more decoders of the processor. The decoder may generate as its output a micro operation such as a fixed width micro operation in a predefined format, or may generate other instructions, microinstructions, or control signals which reflect the original code instruction. Processor 114 may also include register renaming logic and scheduling logic, which generally allocate resources and queue the operation corresponding to the convert instruction for execution. After completion of execution of the operations specified by the code instructions, back end logic within processor 114 may retire the instruction. In one embodiment, processor 114 may allow out of order execution but requires in order retirement of instructions. Retirement logic within processor 114 may take a variety of forms as known to those of skill in the art (e.g., re-order buffers or the like). The processor cores of processor 108 are thus transformed during execution of the code, at least in terms of the output generated by the decoder, the hardware registers and tables utilized by the register renaming logic, and any registers modified by the execution logic VMs on electronic device 101 may be grouped according to classes of VMs. Such classes may be used for any suitable logical groupings and may include, for example, similarly applied or provisioned VMs, users of VMs, or VMs dedicated to certain applications or kinds of applications. For example, VMs 102 may be included within class$_N$, and VMs 108 may be included within class$_M$. In the example of FIG. 1, VMs 102 may be included within class$_N$ and provisioned for anti-malware operations.

VMs 102 may include any suitable mechanism for anti-malware operation. Fore example, VMs 102 may include an anti-malware module 104. Anti-malware module 104 may be implemented in similar fashion across all VMs 102. Anti-malware module 104 may be configured to protect VM 102 from malware by, for example, conducting malware scanning, scanning incoming data, conducting behavior analysis, comparing elements of VM 102 to signatures of known malware, or protecting access to system resources. Anti-malware module 104 may be implemented by, for example, a program, application, proxy, engine, function, library, shared library, script, logic, instructions, or any suitable combination thereof.

Periodically, anti-malware module 104 may require additional or updated information, as new malware is developed, zero-day attacks are made and responded to, and as researchers develop new techniques for fighting malware. Anti-malware module 104 may be communicatively coupled to, for example, an anti-malware server 118 over a network connection to receive such information. Anti-malware server 118 may be configured to send new rules, definition files, signatures, or other suitable information to anti-malware module 104. Anti-malware server 118 may be implemented by any suitable program, application, proxy, engine, function, library, shared library, script, logic, instructions, electronic device, analog circuitry, digital circuitry, or any suitable combination thereof.

Various operations of anti-malware module 104, such as conducting scanning for malware or downloading and installing new information from anti-malware server 118, may be resource-intensive. These operations may consume significant portions of machine resources 112, such as processor time or memory. Furthermore, if multiple instances of anti-malware module 104 conduct similar operations at the same time as other instances of anti-malware module 104, the consumption of machine resources 112 may be even further exacerbated.

Similarly, other elements of VM 104, such as programs, applications, scripts, utilities, or functions, may consume significant amounts of resources while conducting various specific operations. Simultaneous and similar operations from equivalent instances of such elements may similarly exacerbate the consumption of machine resources 112.

VM 104 may include a monitor module 106 configured to monitor the usage of machine resources 112, or at least the view of such resources as visible from VM 104, in view of operations of various elements of VM 104. Furthermore, monitor module 106 may be configured to monitor such usage in view of the operations of multiple instances of a given element of VM 104 across multiple such VMs 104. For example, monitor module 106a may be configured to monitor the operations performed and resources consumed by anti-malware module 104a in VM 102a, and upon the usage or availability of machine resources 112 available. Furthermore, monitor module 106 may be configured to monitor the operations performed by other instances of anti-malware module, such as anti-malware module 104b and anti-malware module 104c in their respective VMs, VM 102b and VM 102c. Any suitable operation may be monitored, such as a phase of scanning, downloading, or installation. Similarly, monitor module 106 may be configured to monitor the operations of other elements of VM 102 across multiple instances of such elements across different instances of VM 102. In one embodiment, monitor module 106 may be configured to monitor the operation of elements of VMs from within the same VM class that it resides. For example, monitor module 106 may be configured to monitor the operations from any of VMs 102 within class$_N$. However, monitor module 106 may be unable to monitor the operations from VMs 108 within class$_N$ because such VMs 108 may not be provisioned in a similar fashion as VMs 102. Specifically, VMs 108 might not include instances of monitor module 106.

Monitor module 106 may be configured to monitor operations of elements from other VMs in any suitable manner. In one embodiment, monitor module 106 may be configured to monitor operations of elements from other VMs through synchronization with other instances of monitor module 106. For example, monitor module 106a may reside in VM 102a, while monitor module 106b may reside in VM 102b. Monitor module 106a may monitor the specific operations of elements of VM 104a, such as the actions and resources used by anti-malware module 104a. Similarly, monitor module 106b may monitor the specific operation of elements of VM 104b, such as the actions and resources used by anti-malware module 104b. Monitor module 106a and monitor module 106b may communicate to indicate to each other the operations employed by their respective elements. Furthermore, monitor module 106a and monitor module 106b may communicate to indicate the resources used by their respective elements.

By knowing what other instances are utilizing, monitor module 106 may be configured to perform self-regulation. For example, given indications from other instances that particular operations are being conducted, monitor module 106a may limit the equivalent operations on VM 102a. In another example, given indications from other instances that certain resources are being used, monitor module 106a may limit the use of the same resources on VM 102a.

Monitor module 106 may be configured to limit the operations of elements of VM 102 in any suitable manner. In one embodiment, these elements, such as anti-malware module 104a, may be configured to invoke monitor module 106 before commencing operations that may need to be regulated. Invoking monitor module 106 may be used as a predicate check or a check during operation to make sure that usage across all instances of VMs 102 is within required parameters. In another embodiment, such elements may perform checks to a table, data structure, or other entity that receives information populated by anti-malware module 104a.

To provide information to other instances of monitor module 106, an instance of monitor module 106 may be configured to send messages regarding initiation or completion of an operation of, for example, anti-malware module 104. Furthermore, an instance of monitor module 106 may be configured to send messages regarding usage of resources by anti-malware module 104 or of VM 102. Monitor module 106 may be configured to mine such information from, for example, being invoked from anti-malware module 104.

Accordingly, monitor module 106 may reside in any suitable portion of VM 104. In one embodiment, monitor module 106 may reside within an element of VM 104 that monitor module 106 will monitor. For example, monitor module 106 may reside within anti-malware module 104. In another embodiment, monitor module 106 may reside as a stand-alone entity within VM 104, and may be invoked through inter-application calls or communication by, for example, anti-malware module 104. In yet another embodiment, monitor module 106 may reside as a portion of the operating system of VM 104, and may be invoked through operating system function calls.

Monitor module 106 may be resident and execute in VM 102. Its operation may be observed, controlled, and monitored through virtualization monitor 110. Furthermore, its access of machine resources 112 may be observed, controlled, and monitored through virtualization monitor 110. Consequently, monitor module 106 may, without any additional information, be unaware of even the existence of other instances of monitor module 106, anti-malware module 104, or VM 102. In order to become aware of its peers, monitor module 106 may take any suitable action.

Figure 2:
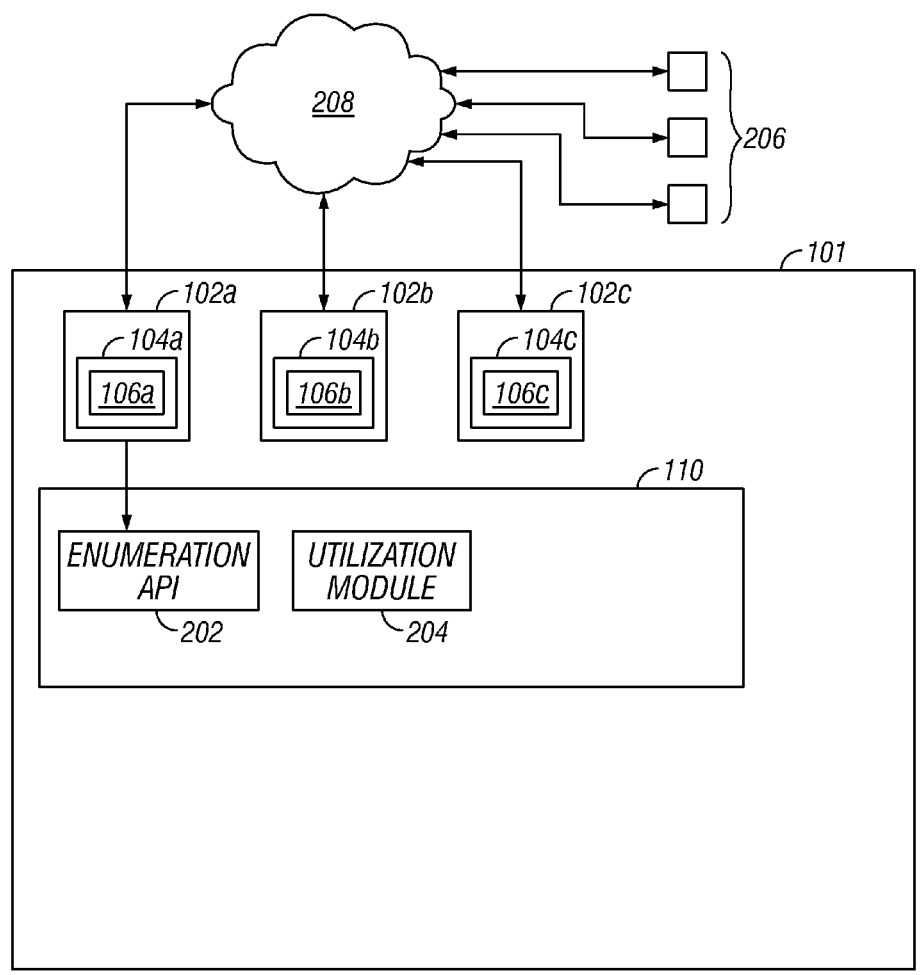
FIG. 2 is an illustration of example operation of a system for virtual machines to discover peer virtual machines on the same electronic device.

FIG. 2 is an illustration of example operation of system 100 for virtual machines to discover peer virtual machines on the same electronic device.

In one embodiment, monitor module 106 may be configured to access functions of virtualization module 110 to solicit or query whether additional instances of VM 102 exist and, if so, how such VMs 102 may be addressed. For example, virtualization module 110 may include an enumeration application programming interface (API) 202 configured to provide functionality to elements within VM 102 for discovering and addressing other instances of VMs operating on electronic device 101 controlled by virtualization module 110. In the example of FIG. 2, monitor module 106a in VM 102a may query virtualization module 110 using enumeration API 202 to determine the existence, and possible address, of VM 102b and VM 102c. Furthermore, virtualization module 110 may include a utilization module 204 configured to provide information regarding the total usage of machine resources 112 across electronic device 101. Utilization module 204 and enumeration API 202 may be implemented in any suitable manner, such as by an application, function, logic, instructions, program, script, library, shared library, function, add-in, or other suitable entity.

However, in some cases such functions may be unavailable from virtualization module 110. In another embodiment, monitor module 106 may be configured to perform broadcast network messages to determine other VMs 102, 108 located on the same electronic device 101. Monitor module 106 may be configured to make any suitable broadcast network messages. For example, monitor module 106 may be configured to broadcast messages across network 208. Network 208 may include, for example, an intranet, the Internet, a local area network, a wide area network, a wireless network, or any combination thereof. In one embodiment, monitor module 106 may be configured to broadcast messages across a portion of network 208. For example, monitor module 106 may be configured to broadcast messages to a subnet, logical network subdivision, or network hierarchy level of network 208 to which VM 102 belongs.

The messages broadcast by monitor module 106 may include, for example, messages querying whether other instances of monitor module 106 exist, that monitor module 106 is active, that monitor module 106 is operating upon a particular VM, that monitor module 106 is operating upon a particular VM class, that monitor module 106 is operating upon a particular electronic device, that monitor module 106 is inactive, that a particular operation of an element of VM 102 has commenced—such as a scanning or update operation of anti-malware module 104, that a particular operation of an element of VM 102 has completed, or usage of machine resources 112. Such messages may also be sent by monitor module 106 directly to other instances of monitor module 106 once such instances are discovered or enumerated.

By sending messages to network 208 or a subnet thereof, messages may be received by other instances of monitor module 106 with the same class of VMs. However, such messages may also be received by other recipients 206 not within the same class of VMs and possibly not within the same electronic device. Such recipients 206 may ignore such broadcast messages. Further, the messages may be encrypted such that only approved recipients, such as instances of monitor module 106, may interpret them. Instances of monitor module 106 may be configured to listen for such messages on, for example, a pre-designated port.

In operation, one or more VMs 102 may be operating on electronic device 101. Access to system resources 112 of electronic device 101 may be virtualized to VMs 102 by virtualization module 110. Furthermore, the operation and instantiation of each of VMs 102 may be secured, monitored, and handled by virtualization module 110. An instance of anti-malware module 104 may be operating within an associated instance of VM 102. Furthermore, an instance of monitor module 106 may be operating within an associated instance of VM 102.

A given instance of monitor module 106 may determine other instances of monitor module 106 operating on electronic device 101. Monitor module 106 may send out broadcast messages identifying the instance of monitor module 106, its virtual machine 102, or its electronic device 101 to a portion of network 208. Monitor module 106 may invoke enumeration API 202 to determine other instances of monitor module 106 operating on electronic device 101. Such determinations may be made startup of monitor module 106, or upon startup for an element which monitor module 106 is monitoring, such as anti-malware module 104. Furthermore, such determination may be made as an element monitored by monitor module 106, such as anti-malware module 104, attempts to enact a specified operation, such as anti-malware scanning or update and installation of anti-malware information.

Monitor module 106 may inform other instances of monitor module 106 of intended actions by the monitored element. In addition, monitor module 106 may evaluate the usage of resources by its monitored elements, usage of resources by other instances of VM 102, operations being performed by monitored elements in other instances of VM 102, or total resource usage or availability in electronic device 101.

In one embodiment, monitor module 106 may track received messages from other instances of monitor module 106. Consequently, monitor module 106 may include a running total or accounting of current operations by other VMs 102, or of resources in use by other VMs 102. Such running totals or accounting may be used by, for example, instances of monitor module 106 wherein information about operations and usage are transmitted via broadcast messages. In another embodiment, monitor module 106 may query each of other VMs 102 when information is needed.

Based on the evaluations of usage and operations of other VMs 102, and upon the resource usage identified by virtualization module 110, monitor module 106 may, for example, postpone operations of its monitored elements such as anti-malware module 104, enable such operations, or stop such existing operations. Furthermore, upon taking any such action, monitor module 106 may inform other instances of monitor module 106.

Monitor module 106 may use any suitable criteria when evaluating its peers for regulating the operations within its own VM. Furthermore, monitor module 106 may use such criteria to regulate any suitable operations within its own VM.

Figure 3:
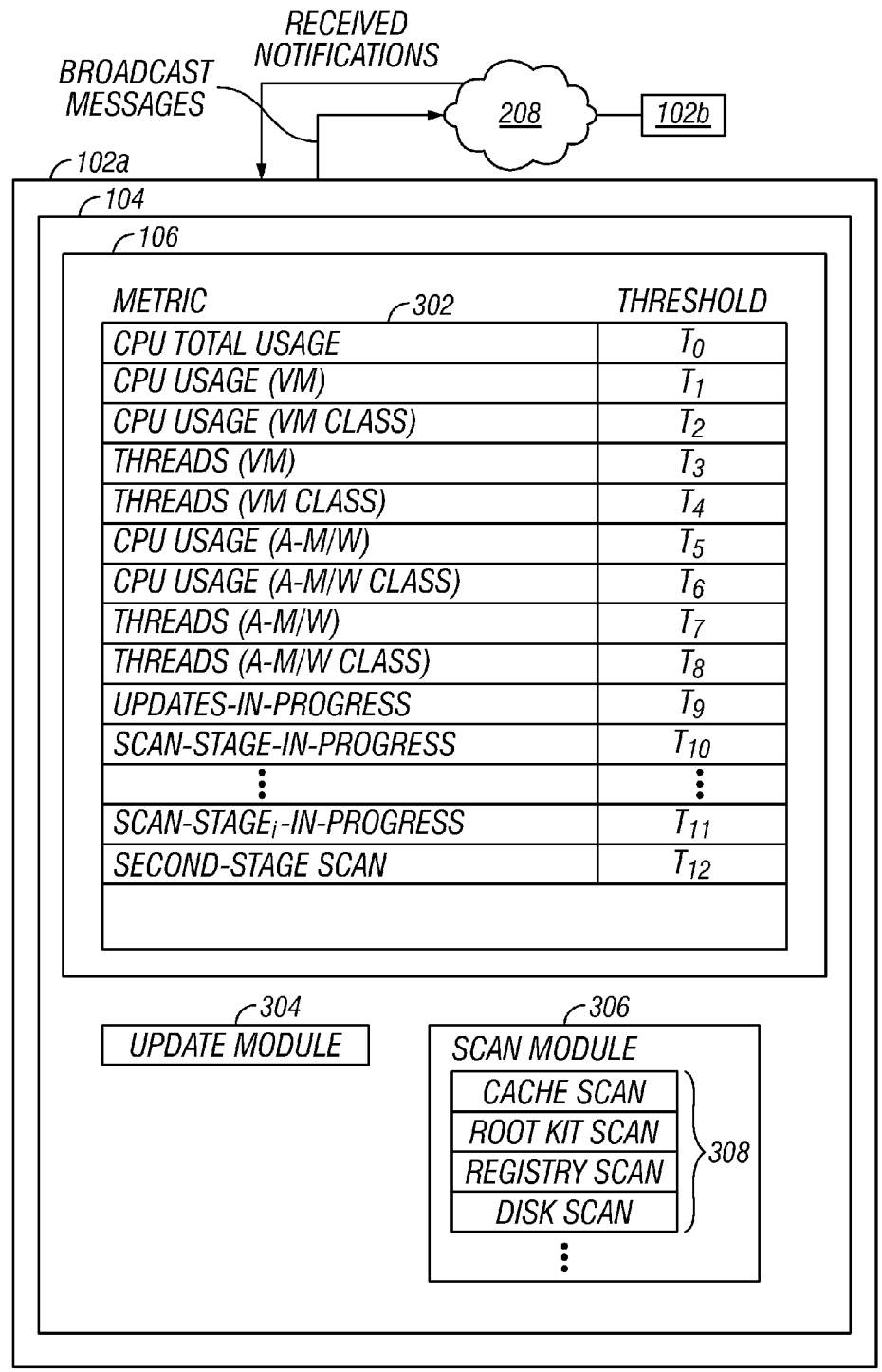
FIG. 3 is an illustration of rules used by a monitor module to determine self-regulation of operations.

FIG. 3 is a more detailed illustration of rules 302 used by monitor module 106 to determine self-regulation of operations. Monitor module 106 may include one or more rules 302 used to evaluate whether to conduct operations, postpone operations, or terminate existing operations. Such operations may include, for example, whether to update anti-malware information or conduct an anti-malware scan.

Operations for updating anti-malware information may be performed by, for example, update module 304. Update module 304 may be configured to, upon initiation by anti-malware module 104 or monitor module 106, contact a source of information such as anti-malware server 118 for updated anti-malware information. Update module 304 may be configured to download such information and install it for use within VM 102. Update module 304 may be implemented in any suitable manner, such as by an application, logic, instructions, program, script, library, shared library, function, add-in, agent, proxy, utility, or combination thereof.

Conducting an anti-malware scan may be performed by, for example, scan module 306. Scan module 306 may be configured to, upon initiation by anti-malware module 104 or monitor module 106, scan machine resources 112 available to VM 102 for indications of malware. Furthermore, scan module 306 may include one or more modes 308 of operation. Such modes 308 may include, for example, modules for different kinds of scans, different qualities of scan, and scans of different portions of machine resources 112. Each of modes 308 of operation may intensively use different resources. Thus, each of modes 308 may be selectively invoked by anti-malware module 104. In the example of FIG. 3, modes 308 may include a cache scan, configured to scan changed elements since a previous can; a rootkit scan, configured to scan for indications of rootkits; a registry scan, configured to scan an operating system registry; or a disk scan, configured to scan an entire disk or storage for indications of malware as they reside on-disk. Scan module 306 may be implemented in any suitable manner, such as by an application, logic, instructions, program, script, library, shared library, function, add-in, agent, proxy, utility, or combination thereof.

Rules 302 may include any suitable combination of criteria, metrics, measurements, or other indications of resource usage, operations being conducted, or other factors related to performance of electronic device 101. For example, rules 302 may include various metrics by which operations are regulated. In another example, rules 302 may include a threshold associated with each such metric. Monitor module 106 may be configured to evaluate an operation by determining whether the execution of the operation would violate, or is violating, any applicable rules 302. If such an operation would or is violating an applicable rule, then the operation may be postponed or terminated. If such an operation would not violate an applicable rule, then the operation may be allowed.

For example, rules 302 may include criteria that the total usage of a central processing unit (CPU) or other processor or processors of machine resources 112 in electronic device 101 should not exceed a threshold $T_0$. The information of the total processor usage may be determined by querying virtualization module 110. Such criteria may be combined with other criteria in rules 302.

Rules 302 may include criteria that the CPU usage within machine resources 112 in electronic device 101 as used by the instance of VM 102 should not exceed a threshold $T_1$. Such criteria may thus include analysis of the CPU usage of the individual VM 102, as opposed to CPU usage due to other elements running on electronic device 101.

Rules 302 may include criteria that the CPU usage within machine resources 112 in electronic device 101 as used by all of the VMs within a designated VM class should not exceed a threshold $T_2$. For example, such criteria may require that the all instances of VM 102 within class$_N$ should not exceed the CPU usage threshold. To determine such CPU usage by all of the VMs within a designated VM class, monitor module 106 may coordinate reporting of resource usage with other instances of monitor module 106 within other VM instances on electronic device 101.

Rules 302 may include criteria that the number of threads executing in the given instance of VM 102 should not exceed a threshold $T_3$. Such criteria may thus include analysis of the usage of the individual VM 102, as opposed to CPU usage due to other elements running on electronic device 101.

Rules 302 may include criteria that the total number of threads executing in the class of VMs should not exceed a threshold $T_4$. For example, such criteria may require that the total number of threads within all instances of VM 102 within class$_N$ should not exceed the threshold. To determine such numbers of threads, monitor module 106 may coordinate reporting of resource usage with other instances of monitor module 106 within other VM instances on electronic device 101.

Rules 302 may include criteria that the CPU usage within machine resources 112 in electronic device 101 as used by a particular monitored element of VM 102—such as anti-malware module 104—should not exceed a threshold $T_5$. Such criteria may thus include analysis of the CPU usage of the individual instance of anti-malware module 104, as opposed to CPU usage due to other elements running on electronic device 101.

Rules 302 may include criteria that the CPU usage within machine resources 112 in electronic device 101 as used by all instances of a monitored element of VM 102—such as anti-malware module 104—within the VMs within a designated VM class should not exceed a threshold $T_6$. To determine such CPU usage by all of the instances of a given element within the VMs of a designated VM class, monitor module 106 may coordinate reporting of resource usage with other instances of monitor module 106 within other VM instances on electronic device 101.

Rules 302 may include criteria that the total number of threads executing by a particular monitored element of VM 102—such as anti-malware module 104—should not exceed a threshold $T_7$. Such criteria may thus include analysis of the threads used within the individual instance of anti-malware module 104, as opposed to thread usage due to other elements running on electronic device 101.

Rules 302 may include criteria that the total number of threads executing by the instances of particular element—such as anti-malware module 104—within the VMs within a designated VM class should not exceed a threshold $T_8$. To determine such thread usage by all of the instances of a given element within the VMs of a designated VM class, monitor module 106 may coordinate reporting of resource usage with other instances of monitor module 106 within other VM instances on electronic device 101.

Rules 302 may include criteria that, for a designated operation, the total number of such operations across instances of a particular element—such as anti-malware module 104—within the VMs within a designated VM class should not exceed specified thresholds. Given the example of anti-malware module 104, such criteria may include update operations, or one of any number and kind of scanning operations. Such operations may be employed by, for example, update module 304 or scan module 308.

For example, rules 302 may include criteria that the total number of updates currently in progress across instances of anti-malware module 104 within the designated VM class should not exceed a threshold $T_9$. To determine the number of updates in operation across all VMs of a designated VM class, monitor module 106 may coordinate reporting of update operations. Such reporting may include reporting when an update operation has started and when an update operation has finished. Before starting a new update operation, monitor module 106 may determine whether the addition of the new update operation would cause the total number of updates currently in progress across the designated VM class to exceed threshold $T_9$. If so, monitor module 106 may postpone the update operation. If not, monitor module 106 may allow the update operation. In one embodiment, a single update operation within a designated VM class may be permitted at a time.

Rules 302 may include criteria that the total number of scans, or the scans of a specified scan mode 308, currently in progress across instances of anti-malware module 104 within the designated VM class should not exceed a threshold. Each of thresholds $T_{10} \ldots T_{11}$ may correspond to a threshold specific to a given scan mode 308. To determine the number scans and the kinds thereof in operation across all VMs of a designated VM class, monitor module 106 may coordinate reporting of scan operations. Such reporting may include reporting when a scan operation has started and when a scan update operation has finished. Before starting a new scan operation, monitor module 106 may determine whether the addition of the new scan operation would cause the total number of scans currently in progress across the designated VM class to exceed the designated threshold. If so, monitor module 106 may postpone the scan operation. If not, monitor module 106 may allow the scan operation.

Rules 302 may include criteria that the total number of second-stage scans currently in progress across instances of anti-malware module 104 within the designated VM class should not exceed a threshold $T_{12}$. Second-stage scans may include, for example, scans for malware when a preliminary indication of malware has already been fan. Thus, second-stage scans may be more resource intensive and a higher priority than other scans. Before starting a new second-scan operation, monitor module 106 may determine whether the addition of the new second-scan operation would cause the total number of second-scans currently in progress across the designated VM class to exceed the designated threshold. If so, monitor module 106 may postpone the second-scan operation. If not, monitor module 106 may allow the second-scan operation.

In various embodiments, the thresholds of rules 302 for a given criteria may reference other criteria within rules 302. Furthermore, individual ones of rules 302 may be compounded or added with other ones of rules 302. For example, application of thresholds $T_9 \ldots T_{12}$, regulating the number of specified operations that may be conducted across instances of VMs in a given VM class, may be applied only if thread or CPU usage exceeds a given one or more of thresholds $T_9 \ldots T_{12}$.

For example, application of thresholds $T_9 \ldots T_{12}$ may be made in conjunction with CPU total usage, as represented by threshold $T_0$. If CPU total usage is below threshold $T_0$, application of thresholds $T_9 \ldots T_{12}$ may not be necessary. If CPU total usage is above threshold $T_0$, application of thresholds $T_9 \ldots T_{12}$ may be performed. In another example, application of thresholds $T_9 \ldots T_{12}$ may be made in conjunction with CPU usage for the VM 102 (threshold $T_1$) or CPU usage for a whole VM class (threshold $T_2$). If the CPU usage for VM 102 exceeds threshold $T_1$ or the CPU usage for a whole VM class exceeds threshold $T_2$, then application of thresholds $T_9 \ldots T_{12}$ may be performed.

In another example, thresholds may be made defined in relation to each other. For example, thresholds $T_9$, $T_{10}$, and $T_{11}$ may include a threshold value that is conditional or related to the measurement of the number of second-stage scans in progress. As second-stage scans may be performed once an indication of malware has been made, second-stage scans may be a higher priority than other operations. Thus, thresholds $T_9$, $T_{10}$, and $T_{11}$ may be lowered given a higher number of second-stage scans.

By accomplishing self-regulation that is peer-aware, each instance of anti-malware module 104 and monitor module 106 may operate in a manner that best maximizes use of resources of electronic device 101 while mitigating impact to other elements running on electronic device 101 and within the instances of VM 102. By making such regulation the responsibility of an individual instance of monitor module 106, coordination of anti-malware operations may be unnecessary to be performed by virtualization module 110.

Figure 4:
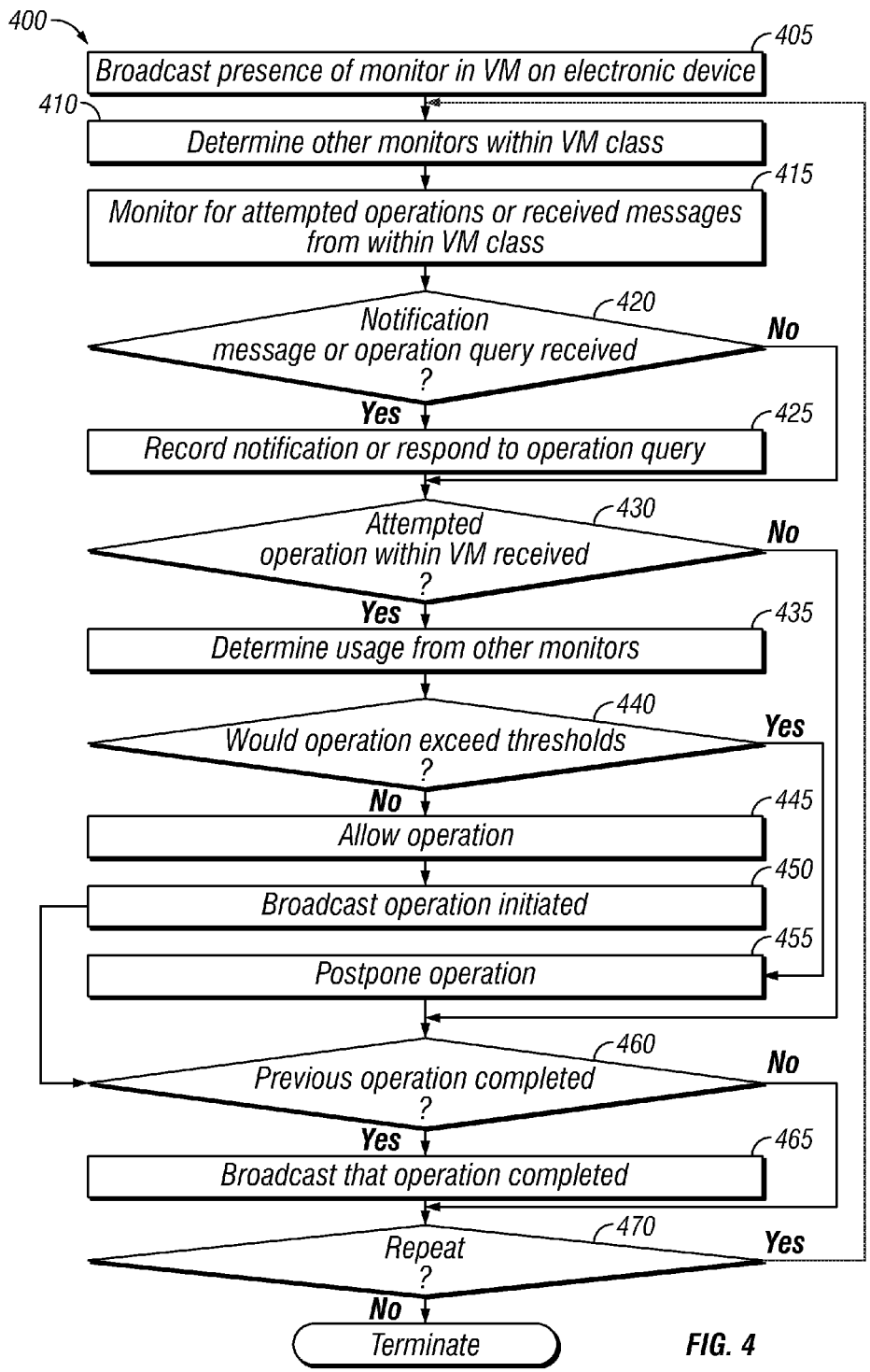
FIG. 4 is an illustration of an example embodiment of a method for peer-aware self-regulation for virtualized environment.

FIG. 4 is an illustration of an example embodiment of a method 400 for peer-aware self-regulation for virtualized environment. Method 400 may be initiated by any suitable criteria. Furthermore, although method 400 describes a client and a server, method 400 may be performed by any network node recipient, network node sender, and monitor. Method 400 may be implemented using the system of FIGS. 1-3 or any other system operable to implement method 400. As such, the preferred initialization point for method 400 and the order of the elements comprising method 400 may depend on the implementation chosen. In some embodiments, some elements may be optionally omitted, repeated, or combined. In certain embodiments, method 400 may be implemented partially or fully in software embodied in computer-readable media.

At 405, in one embodiment the presence of a monitor in an instance of a VM on an electronic device may be broadcast. In another embodiment, the presence of the monitor may be made by registration with, for example, a virtualization module configured to virtualize access for the VM. The presence may be broadcast by, for example, broadcasting a message to a subnet to which the VM is connected. Similarly configured monitors on other VMs within the VM class may be resident on the same electronic device, may be connected to the same subnet, and may receive the broadcast messages. The broadcast messages may identify the VM, the VM class, and the electronic device. Recipients that are not within the same VM class may ignore the broadcast messages. The broadcast messages may be made on a specified or configured network port. Furthermore, the broadcast messages may be encrypted.

At 410, other monitors on other VMs within the VM class may be determined Such a determination may be made by, for example, receiving reply messages in response to the broadcast made at 405; querying the virtualization module for addresses of VMs; or by monitoring for other messages received by such monitors in 415.

At 415, attempted operations that may be regulated by the monitor within the VM as well as received messages from other monitors in the VM class may be monitored.

At 420, it may be determined whether a notification message or an operation query has been received from another VM. Such a notification message may include, for example, a notification that a particular operation has commenced or ended, that usage of a resource has met a certain level, or any other relevant information for peer-aware self-regulation. An operation query may include, for example, a message inquiring about whether specific operations, such as malware scanning or anti-malware information updating, are underway within the VM. Furthermore, an operation query may include a message inquiring about resource usage or number of threads in use. If no such messages or queries are received, method 400 may proceed to 420. If such messages or queries are received, at 425 such messages may be recorded, or such a query may be answered.

At 430, it may be determined whether one of one or more specified operations has been attempted within the VM. Such an attempted operation may include, for example, one or more modes of malware scanning or updating of anti-malware information. If so, method 400 may proceed to 460. If no, method 400 may proceed to 435. At 435, usage information from other VMs may be determined Such information may include whether particular operations on such VMs, such as scanning or updating, are being performed, or information about machine resources used by the respective VM. Usage information may be obtained by, for example, sending queries to other VMs through broadcast messages or direct messages, or by querying a virtualization module configured to virtualize operation of the VMs. Such usage information may be requested in real-time, or may be logged as information arrives from other VMs, such as those received in 420.

At 440, it may be determined whether the detected operation would exceed specified thresholds. Such thresholds may include, for example, the number of operations on other instances of VMs within the same VM class on the electronic device, the resource usage of such operations on the present VM or other VM instances, or the total available resources on the present VM, other VM instances, or the electronic device. If the detected operation would exceed specified thresholds, method 400 may proceed to 455. If the detected operation would not exceed specified thresholds, method 400 may proceed to 445.

At 445, the operation may be allowed to execute. Other operations, as needed depending upon the priority of the operation allowed to execute, may be regulated, throttled, paused, or given fewer resources or threads as required to maintain operations specified by thresholds at 440. At 450, information about the operation may be broadcast or recorded for use by other VM instances.

At 455, the operation may be denied, postponed, or cause other operations to be modified. For example, the operation may be cancelled. In another example, the operation may be postponed until a subsequent execution of method 400. In yet another example, other operations may be regulated, throttled, paused, or given fewer resources or threads. The operation may be reevaluated upon another iteration of the elements of method 400.

At 460, it may be determined whether any previously allowed operations have completed. If so, at 465 it may be broadcast or recorded for use by other VM instances. If not, method 400 may proceed to 470.

At 470, method 400 may optionally repeat or terminate. Method 400 may repeat any suitable number of its elements, such as by proceeding to 410.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing. The following examples pertain to further embodiments. Specifics in the examples may be used anywhere in one or more embodiments described above or herein.

The following examples pertain to further embodiments.

A method for self-regulation of virtualized environments may be performed on an electronic device. Any suitable portions or aspects of the method may be implemented in at least one machine readable storage medium or in a system, as described below. The method may include any suitable combination of elements, actions, or features. For example, the method may include, by a virtual machine on an electronic device, detecting an attempted anti-malware operation by a monitored module. The method may include, by the virtual machine on an electronic device, determining anti-malware operation levels of one or more other virtual machines on the electronic device. The method may also include, based on the attempted anti-malware operation and upon the anti-malware operation levels, determining whether to allow the attempted operation. Furthermore, the attempted operation may include an anti-malware scan. In addition, the attempted operation may include an installation of anti-malware information. The attempted anti-malware operation may include generating one or more execution threads, and the anti-malware operation levels of one or more other virtual machines on the electronic device may include a quantification of one or more threads associated with anti-malware operations. The attempted anti-malware operation levels of one or more other virtual machines on the electronic device may include a quantification of resources used by one or more other anti-malware operations. The attempted anti-malware operation may include one mode of a plurality of modes of anti-malware scanning, and the anti-malware operation levels of one or more other virtual machines on the electronic device include a quantification of the mode of anti-malware scanning. Determining anti-malware operation levels of one or more other virtual machines on the electronic device may include sending a message to a subnetwork communicatively coupled to the virtual machine.

At least one machine readable storage medium may include computer-executable instructions carried on the computer readable medium. Various aspects of the medium may implement any suitable portions or combinations of the method described above or the system described below. The instructions may be readable by a processor. The instructions, when read and executed, may cause the processor to, by a virtual machine on an electronic device, detect an attempted anti-malware operation by a monitored module. Also, the instructions may cause the processor to, by the virtual machine on an electronic device, determine anti-malware operation levels of one or more other virtual machines on the electronic device. The instructions may also cause the processor to, based on the attempted anti-malware operation and upon the anti-malware operation levels, determine whether to allow the attempted operation. Furthermore, the attempted operation may include an anti-malware scan. In addition, the attempted operation may include an installation of anti-malware information. The attempted anti-malware operation may include generating one or more execution threads, and the anti-malware operation levels of one or more other virtual machines on the electronic device may include a quantification of one or more threads associated with anti-malware operations. The attempted anti-malware operation levels of one or more other virtual machines on the electronic device may include a quantification of resources used by one or more other anti-malware operations. The attempted anti-malware operation may include one mode of a plurality of modes of anti-malware scanning, and the anti-malware operation levels of one or more other virtual machines on the electronic device include a quantification of the mode of anti-malware scanning. Determining anti-malware operation levels of one or more other virtual machines on the electronic device may include sending a message to a subnetwork communicatively coupled to the virtual machine.

A system may be configured for self-regulation for virtualized environments. The system may implement any suitable portions or combinations of the method or the at least one machine readable storage medium as described above. The system may include a virtualization module configured to virtualize access to one or more resource of an electronic device for one or more virtual machines. The system may further include a processor coupled to a computer readable medium. The system may also include a monitor module. The monitor module may include computer-executable instructions carried on the computer readable medium. The instructions may be readable by the processor. The instructions, when read and executed, may configure the monitor module, by a virtual machine on an electronic device, detect an attempted anti-malware operation by a monitored module. The virtual machine may be configured to access one or more virtualized resources provided by the virtualization module. Also, the instructions may configure to monitor module to, by the virtual machine on an electronic device, determine anti-malware operation levels of one or more other virtual machines on the electronic device. The instructions may also configure to monitor module, based on the attempted anti-malware operation and upon the anti-malware operation levels, determine whether to allow the attempted operation. Furthermore, the attempted operation may include an anti-malware scan. In addition, the attempted operation may include an installation of anti-malware information. The attempted anti-malware operation may include generating one or more execution threads, and the anti-malware operation levels of one or more other virtual machines on the electronic device may include a quantification of one or more threads associated with anti-malware operations. The attempted anti-malware operation levels of one or more other virtual machines on the electronic device may include a quantification of resources used by one or more other anti-malware operations. The attempted anti-malware operation may include one mode of a plurality of modes of anti-malware scanning, and the anti-malware operation levels of one or more other virtual machines on the electronic device include a quantification of the mode of anti-malware scanning. Determining anti-malware operation levels of one or more other virtual machines on the electronic device may include sending a message to a subnetwork communicatively coupled to the virtual machine.

A system for self-regulation of virtualized environments may be performed on an electronic device. Any suitable portions or aspects of the system may be implemented in at least one machine readable storage medium or in a system, as described below. The system may include any suitable combination of elements, actions, or features. For example, the system may include, by a virtual machine on an electronic device, means for detecting an attempted anti-malware operation by a monitored module. The system may include, by the virtual machine on an electronic device, means for determining anti-malware operation levels of one or more other virtual machines on the electronic device. The system may also include, based on the attempted anti-malware operation and upon the anti-malware operation levels, means for determining whether to allow the attempted operation. Furthermore, the attempted operation may include an anti-malware scan. In addition, the attempted operation may include an installation of anti-malware information. The attempted anti-malware operation may include generating one or more execution threads, and the anti-malware operation levels of one or more other virtual machines on the electronic device may include a quantification of one or more threads associated with anti-malware operations. The attempted anti-malware operation levels of one or more other virtual machines on the electronic device may include a quantification of resources used by one or more other anti-malware operations. The attempted anti-malware operation may include one mode of a plurality of modes of anti-malware scanning, and the anti-malware operation levels of one or more other virtual machines on the electronic device include a quantification of the mode of anti-malware scanning. Determining anti-malware operation levels of one or more other virtual machines on the electronic device may include sending a message to a subnetwork communicatively coupled to the virtual machine.

Specifics in the examples above may be used anywhere in one or more embodiments.

Although the present disclosure has been described in detail, it should be understood that various changes, substitutions, and alterations can be made hereto without departing from the spirit and the scope of the disclosure as defined by the appended claims.

What is claimed is:

1. A method for self-regulation of a virtualized environment, comprising:
   by a first virtual machine on an electronic device:
     detecting a first attempted anti-malware operation by a first monitored module; and
   first anti-malware operation levels of one or more other virtual machines on the electronic device;
   by a second virtual machine on the electronic device:
     detecting a second attempted anti-malware operation by a second monitored module;
     determining second anti-malware operation levels of one or more other virtual machines on the electronic device;
     based on the second attempted anti-malware operation and upon the second anti-malware operation levels, determining whether to allow the second attempted anti-malware operation; and broadcasting a second indication of whether the second attempted anti-malware operation was performed to the other virtual machines on the electronic device; and by the first virtual machine on the electronic device:
based on the first attempted anti-malware operation, the first anti-malware operation levels, and whether the second indication was received, determining whether to allow the first attempted anti-malware operation; and
broadcasting a first indication to the other virtual machines, the first indication to indicate whether the first attempted anti-malware operation was performed.

2. The method of claim 1, wherein the first attempted anti-malware operation includes an anti-malware scan.

3. The method of claim 1, wherein:
the first attempted anti-malware operation includes an installation of anti-malware information; and
the method further comprises determining whether to allow the first attempted anti-malware operation further based upon whether installation of anti-malware information is occurring in the one or more other virtual machines on the electronic device.

4. The method of claim 1, wherein:
the first attempted anti-malware operation includes generating one or more execution threads; and
the first anti-malware operation levels of one or more other virtual machines on the electronic device include a quantification of one or more threads associated with anti-malware operations.

5. The method of claim 1, wherein the first anti-malware operation levels of one or more other virtual machines on the electronic device include a quantification of resources used by one or more other anti-malware operations.

6. The method of claim 1, wherein:
the first attempted anti-malware operation includes one mode of a plurality of modes of anti-malware scanning; and
the first anti-malware operation levels of one or more other virtual machines on the electronic device include a quantification of the mode of anti-malware scanning.

7. The method of claim 1, wherein determining first anti-malware operation levels of one or more other virtual machines on the electronic device includes sending a message to a subnetwork communicatively coupled to the first virtual machine.

8. The method of claim 1, further comprising, by the second virtual machine:
receiving the first indication;
evaluating whether the first indication applies to the operation of the second attempted anti-malware operation; and
based upon a determination that the first indication does not apply to the operation of the second attempted anti-malware operation, discarding the first indication.

9. A system for self-regulation of virtualized environments, comprising:
a virtualization module configured to virtualize access to one or more resources of an electronic device for one or more virtual machines;
a processor coupled to a computer readable medium;
a first monitor module comprising computer-executable instructions carried on the computer readable medium, the instructions readable by the processor, the instructions, when read and executed, for configuring the first monitor module to:
by a first virtual machine on the electronic device, detect a first attempted anti-malware operation by a first monitored module, the first virtual machine configured to access one or more virtualized resources provided by the virtualization module;
by the first virtual machine on the electronic device, determine first anti-malware operation levels of one or more other virtual machines on the electronic device; and
based on the first attempted anti-malware operation and upon the first anti-malware operation levels, determine whether to allow the first attempted anti-malware operation; and
a second monitor module comprising computer-executable instructions carried on the computer readable medium, the instructions readable by the processor, the instructions, when read and executed, for configuring the second monitor module to:
by a second virtual machine on the electronic device, detect a second attempted anti-malware operation by a second monitored module, the second virtual machine configured to access one or more virtualized resources provided by the virtualization module;
by the second virtual machine on the electronic device, determine second anti-malware operation levels of one or more other virtual machines on the electronic device; and
based on the second attempted anti-malware operation and upon the second anti-malware operation levels, determine whether to allow the second attempted anti-malware operation;
wherein:
the second monitor module is further configured to broadcast a second indication of whether the second attempted anti-malware operation was performed to the other virtual machines on the electronic device; and
the first monitor module is further configured to:
broadcast a first indication to the other virtual machines, the first indication to indicate whether the first attempted anti-malware operation was performed; and
determine whether to allow the first attempted anti-malware operation further based upon whether the second indication was received.

10. The system of claim 9, wherein the first attempted anti-malware operation includes an anti-malware scan.

11. The system of claim 9, wherein:
the first attempted anti-malware operation includes an installation of anti-malware information; and
the first monitor module is further configured to determine whether to allow the first attempted anti-malware operation further based upon whether installation of anti-malware information is occurring in the one or more other virtual machines on the electronic device.

12. The system of claim 9, wherein:
the first attempted anti-malware operation includes generating one or more execution threads; and
the first anti-malware operation levels of one or more other virtual machines on the electronic device include a quantification of one or more threads associated with anti-malware operations.

13. The system of claim 9, wherein the first anti-malware operation levels of one or more other virtual machines on the electronic device include a quantification of resources used by one or more other anti-malware operations.

14. The system of claim 9, wherein:
the first attempted anti-malware operation includes one mode of a plurality of modes of anti-malware scanning; and
the first anti-malware operation levels of one or more other virtual machines on the electronic device include a quantification of the mode of anti-malware scanning.

15. The system of claim 9, wherein determining first anti-malware operation levels of one or more other virtual machines on the electronic device includes sending a message to a subnetwork communicatively coupled to the first virtual machine.

16. The system of claim 9, wherein the second monitor module is further configured to:
receive the first indication from the first monitor module;
evaluate whether the first indication applies to the operation of the second attempted anti-malware operation; and
based upon a determination that the first indication does not apply to the operation of the second attempted anti-malware operation, discard the first indication.

17. At least one machine readable non-transitory storage medium, comprising computer-executable instructions carried on the machine readable non-transitory storage medium, the instructions readable by a processor, the instructions, when read and executed, for causing the processor to:
by a first virtual machine on an electronic device:
detect a first attempted anti-malware operation by a first monitored module; and
determine first anti-malware operation levels of one or more other virtual machines on the electronic device;
by a second virtual machine on the electronic device:
detect a second attempted anti-malware operation by a second monitored module;
determine second anti-malware operation levels of one or more other virtual machines on the electronic device;
based on the second attempted anti-malware operation and upon the second anti-malware operation levels, determine whether to allow the second attempted anti-malware operation; and
broadcast a second indication of whether the second attempted anti-malware operation was performed to the other virtual machines on the electronic device; and
by the first virtual machine:
based on the first attempted anti-malware operation, the first anti-malware operation levels, and whether the second indication was received, determine whether to allow the first attempted anti-malware operation; and
broadcast a first indication to the other virtual machines, the first indication to indicate whether the first attempted anti-malware operation was performed.

18. The medium of claim 17, wherein the first attempted anti-malware operation includes an anti-malware scan.

19. The medium of claim 17, wherein:
the first attempted anti-malware operation includes an installation of anti-malware information; and
the medium further comprises instructions for causing the processor to determine whether to allow the first attempted anti-malware operation further based upon whether installation of anti-malware information is occurring in the one or more other virtual machines on the electronic device.

20. The medium of claim 17, wherein:
the first attempted anti-malware operation includes generating one or more execution threads; and
the first anti-malware operation levels of one or more other virtual machines on the electronic device include a quantification of one or more threads associated with anti-malware operations.

21. The medium of claim 17, wherein the first anti-malware operation levels of one or more other virtual machines on the electronic device include a quantification of resources used by one or more other anti-malware operations.

22. The medium of claim 17, wherein:
the first attempted anti-malware operation includes one mode of a plurality of modes of anti-malware scanning; and
the first anti-malware operation levels of one or more other virtual machines on the electronic device include a quantification of the mode of anti-malware scanning.

23. The medium of claim 17, wherein determining first anti-malware operation levels of one or more other virtual machines on the electronic device includes sending a message to a subnetwork communicatively coupled to the first virtual machine.

24. The medium of claim 17, further comprising instructions for causing the processor to, by the second virtual machine:
receive the first indication;
evaluate whether the first indication applies to the operation of the second attempted anti-malware operation; and
based upon a determination that the first indication does not apply to the operation of the second attempted anti-malware operation, discard the first indication.

* * * * *